(12) United States Patent
Fricke et al.

(10) Patent No.: US 9,683,092 B2
(45) Date of Patent: Jun. 20, 2017

(54) POLYMER FIBRES COMPRISING AEROGEL AND METHOD FOR PRODUCTION

(71) Applicant: GABRIEL A/S, Skorping (DK)

(72) Inventors: Anna Fricke, Skorping (DK); Peter Fojan, Gistrup (DK)

(73) Assignee: GABRIEL A/S (DK)

( * ) Notice: Subject to any disclaimer, the term of this patent is extended or adjusted under 35 U.S.C. 154(b) by 0 days.

(21) Appl. No.: 14/773,453

(22) PCT Filed: Mar. 5, 2014

(86) PCT No.: PCT/EP2014/054257
§ 371 (c)(1),
(2) Date: Sep. 8, 2015

(87) PCT Pub. No.: WO2014/135585
PCT Pub. Date: Sep. 12, 2014

(65) Prior Publication Data
US 2016/0024278 A1    Jan. 28, 2016

(30) Foreign Application Priority Data

Mar. 8, 2013 (EP) ..................... 13158320

(51) Int. Cl.
*D01F 1/10* (2006.01)
*C08K 7/26* (2006.01)
*D01D 5/00* (2006.01)
*D01D 1/02* (2006.01)
*D01F 6/66* (2006.01)

(52) U.S. Cl.
CPC ................. *C08K 7/26* (2013.01); *D01D 1/02* (2013.01); *D01D 5/003* (2013.01); *D01F 1/10* (2013.01); *D01F 6/66* (2013.01)

(58) Field of Classification Search
CPC .............. D01D 5/003; D01F 1/10; C08K 7/26
USPC ......................................................... 523/218
See application file for complete search history.

(56) References Cited

U.S. PATENT DOCUMENTS

2012/0171488 A1    7/2012  Yeo
2013/0119294 A1    5/2013  Christensen et al.

FOREIGN PATENT DOCUMENTS

WO    2012/013812 A1    2/2012

OTHER PUBLICATIONS

Extended European search report, dated Nov. 7, 2013, application No. EP13158320.5-1304, 4 pages.
Notification of Transmittal of the ISR and Written Opinion of the ISA (Form PCT/ISA/220), Int'l Search Report, and Written Opinion of the ISA, mailed May 30, 2014 by the ISA, for Int'l Application No. PCT/EP2014/054257, 7 pages.

*Primary Examiner* — Edward Cain
(74) *Attorney, Agent, or Firm* — Ware, Fressola, Maguire & Barber LLP

(57) ABSTRACT

The present invention relates to polymer fibres. More specifically, the invention relates to polymer fibres comprising aero gel particles.

12 Claims, 10 Drawing Sheets

POLYMER FIBRES COMPRISING AEROGEL AND METHOD FOR PRODUCTION

TECHNICAL FIELD OF THE INVENTION

The present invention relates to polymer fibres. More specifically, the invention relates to polymer fibres comprising aero gel particles.

BACKGROUND OF THE INVENTION

Aerogels are a special type of solid material with nanometre-scale pores. Porosity is often in excess of 90%, in some cases as high as 99.9%, and densities can be as low as 3 kg/m$^3$. The unusual properties of the aerogels afford their suitability for many applications in commercial and high-tech fields, such as waste management (gas absorption, radioactive waste confinement), thermal insulation (cryogenic to high temperatures), super-insulating jackets, laser experiments, sensors (ultrasonic and gas), nuclear particle detection (Cherenkov), optics and light-guides, electronic devices, capacitors, high explosive research and catalysts.

As an example, their thermal conductivity (0.014 W/m K at room temperature) is the lowest of any solids, and they also have good transparency. Furthermore, the acoustic properties of aerogels make them effective insulators against noise, and aerogels have the lowest refractive index, and dielectric constant of all solid materials.

However, aero gel is vulnerable to moisture and tensile stress, and could be spoiled rapidly, if water or water vapour comes into contact with the material.

A research group at the University of Akron has reinforced an aero gel by incorporating a fiber in the block of the aero gel, and thereby improving the elastic properties. The American company Aspen markets various products with aero gel in a polymer matrix under the name Space Loft, but these suffer from the weakness that binding of aero gel is weak, and the material thus loses its properties over time when aero gel through physical impact is released.

KR20120082857 discloses a method for fabricating a sheet containing hydrophobic polymers and a dry gel of an organosilane surface modified water glass. The process is limited to a dry gel of water glass and hydrophobic polymers.

Water glass is cross linked with an alcohol, and subsequently hydrophobically modified with an organosilane, such as trimethylchlorosilane. The produced hydrophobically modified silica gel is dissolved in an aprotic organic solvent and mixed with a hydrophobic polymer to form an electrospinning solution. The electrospinning solution is electrospun to form a fiber. The formed fiber comprises a hydrophobic polymer component and a porous component of the hydrophobically modified silica gel. The porous component of the hydrophobically modified silica gel is formed by phase separation caused by rapid evaporation of the solvent within the hydrophobically modified silica gel. Such a structure is referred to as a xerogel. This process results in a considerable shrinkage of the porous texture which the hydrophobically modified silica gel had in the wet stage.

SUMMARY OF THE INVENTION

Hence, one object of the present invention is to stabilise aero gel to make it suitable for many applications in commercial and high-tech fields.

A specific object of the present invention is to produce a material comprising aero gel, which can withstand mechanical stress, and at the same time protect the aero gel from climatic conditions.

The above objects are solved by using a composite fiber, in which the aero gel particle is encapsulated by a polymer matrix. Since the aero gel particle retains its structure within the composite fiber, the good insulation properties are transferred to the composite fiber. The polymer component/matrix contributes with the mechanical properties. The material is designed in such a way that the aero gel particle is completely encapsulated by the polymer matrix. This encapsulation contributes to the protection against climatic conditions. This effect is not accomplished in KR20120082857, where the process results in a composite fiber with a degraded porous texture of the hydrophobically modified silica gel compared to the texture it had in the wet stage. Furthermore, the process does not secure that the hydrophobically modified silica gel is completely covered by the polymer matrix when processed into a composite fiber. This problem is solved by the present invention by forming a polymer micelle with a shell of polymer and a core of aero gel particle.

One aspect of the invention relates to a composite fiber comprising one or more polymer(s) and aero gel particles, wherein the aero gel particles are encapsulated by the one or more polymer(s), and wherein the aero gel particles are positioned along at least a part of said composite fiber.

A second aspect of the invention relates to an electrospin dope comprising a polymer micelle with a shell of polymer and a core of aero gel particle.

A third aspect of the invention relates to a method for production of an electrospin dope comprising the steps of:
  Mixing aero gel particles and one or more polymer(s);
  Adding one or more solvent(s) to said mix to form a polymer micelle with a shell of polymer and a core of aero gel particle in said solvent(s).

A fourth aspect of the invention relates to a method for production of a composite fiber, comprising the steps of:
  Providing an electrospin dope comprising a polymer micelle with a shell of polymer and a core of aero gel particle,
  Subjecting said electrospin dope to a spinning step to obtain (a) fiber.

A fifth aspect of the invention relates to a composite fiber prepared by a process comprising the steps of:
  Mixing aero gel particles and one or more polymer(s);
  Adding one or more solvent(s) to said mix to form a electrospin dope comprising a polymer micelle with a shell of polymer and a core of aero gel particle; and
  Subjecting said electrospin dope to a spinning step to obtain (a) fiber.

A composite fiber according to the present invention can then be processed into a material, e.g. as a nonwoven material.

DETAILED DESCRIPTION OF THE INVENTION

Figure 1:
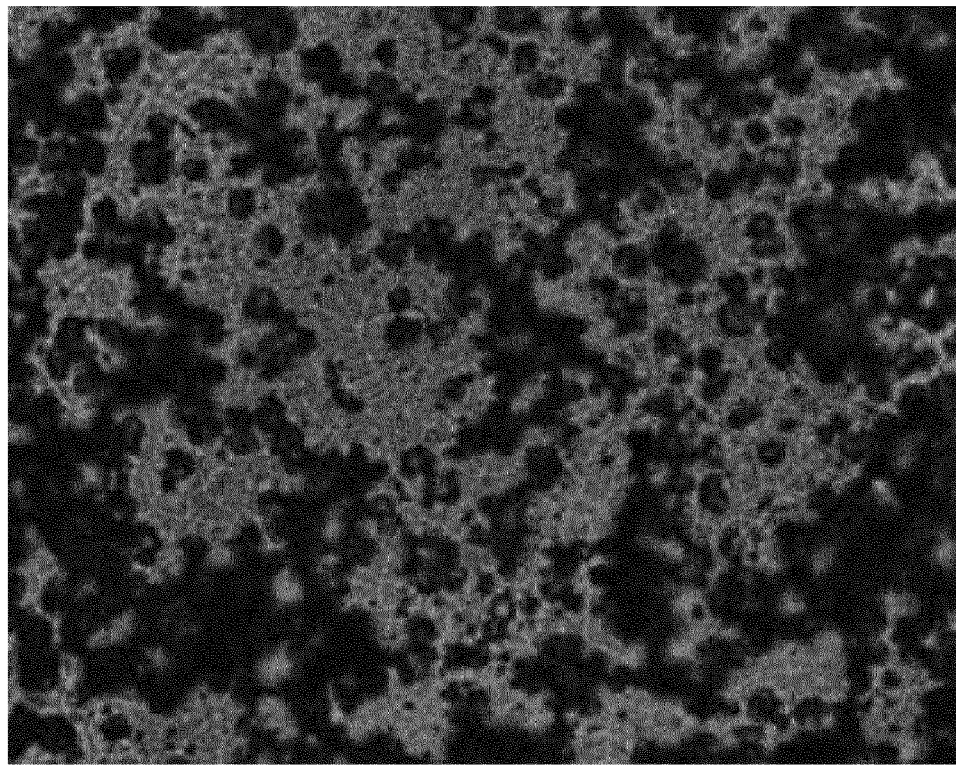
FIG. 1 shows sample Nr. 1 (Table 2) under microscopy, at 10-times magnification. It can be seen that micelles are formed with aero gel particle(s) as core and polymer as shell.

One object of the present invention is to stabilise aero gel to make it suitable for many applications in commercial and high-tech fields.

A specific object of the present invention is to produce an insulation material comprising aero gel particles, which can withstand mechanical stress, and at the same time protect the aero gel particles from climatic conditions.

The above objects are solved by using a composite fiber, in which the aero gel particle(s) are encapsulated by a polymer matrix, as a material for producing products suitable for commercial and high-tech fields. Such a product could e.g. be an insulation material.

In the present context, an encapsulation of the aero gel particle is to be understood as the polymer matrix layer being disposed about the aero gel particle, thereby preventing the aero gel particle from being in contact with the surroundings.

In the present invention, the term "fibre" refers to a unit of matter characterized by a high ratio of length-to-width. Preferably, the fiber can be spun into yarn or made into fabric by interlacing (weaving), interloping (knitting), or interlocking (bonding).

In the present invention, the term "aerogel" refers to an open-celled, mesoporous, solid foam that is composed of a network of interconnected nanostructures and that exhibit a porosity (non-solid volume) of no less than 50%. The term "mesoporous" refers to a material that contains pores ranging from 2 to 50 nm in diameter.

The term aero gel does not refer to a particular substance, but rather to a geometry which a substance can take on. Aerogels can be made of a wide variety of substances, including: Silica, transition metal oxides (for example, iron oxide), lanthanide and actinide metal oxides (for example, praseodymium oxide), main group metal oxides (for example, tin oxide), organic polymers (such as resorcinol-formaldehyde, phenol-formaldehyde, polyacrylates, polystyrenes, polyurethanes, and epoxies), biological polymers (such as gelatin, pectin, and agar agar), semiconductor nanostructures (such as cadmium selenide quantum dots), carbon, carbon nanotubes, and metals (such as copper and gold). Typically, an aero gel is made using sol-gel chemistry to form a solvent filled high-porosity gel. The gel is then dried by removing the solvent without collapsing the tenuous solid phase through a process called supercritical drying. Other processes for the production of aerogels have been developed to lower the production costs. The aero gel is provided as particles of variable size, and the inventors have used an aero gel (silica based, and in powder form) supplied by Sensual Aero gel. The powder has a monodisperse particle distribution with a peak size of 80 µm, and a maximum particle size of 100 µm. In the present context the term "powder" is to be understod as a dry, bulk solid composed of a large number of very fine particles that may flow freely when shaken or tilted.

In the present context the term "particle" is to be understood as a small localized object to which can be ascribed several physical or chemical properties such as volume or mass. The present invention is not limited to any specific particle size, which may range from 0.1 micrometers (µm) to several mm. In one embodiment, the particle size of the aero gel is within the range of 0.1-5000 µm, such as within the range of 0.5-4000 µm, e.g. within the range of 1-3000 µm, such as within the range of 2-2000 µm, e.g. within the range of 5-1000 µm, such as within the range of 10-950 µm, e.g. within the range of 20-900 µm, such as within the range of 30-800 um, e.g. within the range of 40-750 µm, such as within the range of 50-700 µm, e.g. within the range of 60-650 µm, such as within the range of 70-600 µm, e.g. within the range of 80-550 µm, such as within the range of 90-500 µm, e.g. within the range of 100-450 µm.

In another embodiment, the particle size of the aero gel is below 200 µm. This may be an advantage when the composite fiber is used as an insulation material in order to prevent air to flow through the fiber.

Hence, one aspect of the invention relates to a composite fiber comprising one or more polymer(s) and an aero gel, wherein the aero gel is encapsulated by the one or more polymer(s), and wherein the aero gel is positioned along at least a part of said composite fiber.

Another aspect of the invention relates to a composite fiber comprising one or more polymer(s) and aero gel particles, wherein the aero gel particles are encapsulated by the one or more polymer(s), and wherein the aero gel particles are positioned along at least a part of said composite fiber.

To avoid that the aero gel will collapse during processing of such a fiber, the inventors prepared an electrospin dope comprising a polymer micelle with a shell of polymer and a core of aero gel. Preferably, the aero gel is in the form of a particle.

In the present invention, the term "polymer micelle" refers to a well-defined spherical aggregate, having a core and a shell.

The inventors of the present invention have prepared a new type of polymer micelle where the shell is of polymer, and the core is of aero gel.

A second aspect of the invention relates to an electrospin dope comprising a polymer micelle with a shell of polymer and a core of aero gel.

Another aspect of the invention relates to an electrospin dope comprising a polymer micelle with a shell of polymer and a core of aero gel particles.

A micelle was achieved by using the right solvent to force the polymer(s) to self-assemble around the aero gel particle. Depending on the type of aero gel and polymer(s), the choice of solvent may differ.

By using the type of solvent as the driving force, it is not necessary to connect the polymer with the aero gel by covalent bonding.

In one embodiment of the invention, the polymer(s) and aero gel is not connected by covalent bonding.

In some embodiments, solvents are selected based on their tendency to induce the formation of a polymer micelle with a shell of polymer and a core of aero gel.

Furthermore, it is argued that the electrostatic attraction between the polymer(s) and the aero gel particle is only a minor driving force. This means that the choice of solvent can force e.g. a hydrophobic polymer to form a micelle around a hydrophilic aero gel particle, such as a silica aero gel particle.

In one embodiment of the present invention, the aero gel is a silica aero gel, such as a silica aero gel particle.

In another embodiment of the present invention, the polymer(s) are homopolymer(s).

In the present invention, the term "homopolymer" refers to a polymer which is formed from only one type of monomer. This is in contrast to a copolymer/heteropolymer where the polymer contains at least two different monomers.

In yet another embodiment of the present invention, the polymer(s) are block co-polymer(s).

A third aspect of the invention relates to a method for the production of an electrospin dope comprising the steps of:
  Mixing aero gel and one or more polymer(s);
  Adding one or more solvent(s) to said mix to form a polymer micelle with a shell of polymer and a core of aero gel in said solvent(s).

Another aspect of the invention relates to a method for the production of an electrospin dope comprising the steps of:
  Mixing aero gel particles and one or more polymer(s);
  Adding one or more solvent(s) to said mix to form a polymer micelle with a shell of polymer and a core of aero gel particles in said solvent(s).

The electrospin dope is then further processed by a fiber spinning technique, such as wet spinning, gel spinning, or electro-spinning.

When the aero gel is a silica aero gel, it may enhance the blending or mixing with the polymer(s), when the polymer(s) comprises hydrogen bond acceptor atoms that can form hydrogen-bonding interactions with the hydroxyl groups of the silica aero gel.

In yet another embodiment of the present invention, the aero gel is a silica aero gel, and the polymer comprises hydrogen bond acceptor atoms.

When performing an electro-spinning step, the solvents of the electrospin dope should be volatile. The temperature of the electro-spinning step is usually performed within the range from room temperature to the melting temperature of the polymer. Temperatures lower than room temperature may also be used. The utilized pressure is typically about 1 bar under these conditions, but can be lowered in the case of a less volatile solvent to aid the evaporation process.

As previously described, solvents are selected based on their tendency to induce the formation of a polymer micelle with a shell of polymer and a core of aero gel. However, the selection of the solvents may in some embodiments be limited to solvents that have a relatively high vapour pressure, in order to promote the stabilization of an electro-spinning jet to create a fiber as the solvent evaporates. In embodiments involving higher boiling point solvents, it is often desirable to facilitate solvent evaporation by warming the electrospin dope, and optionally the electro-spinning jet itself, or by electro-spinning in reduced atmospheric pressure. It is also believed that creation of a stable jet resulting in a fiber is facilitated by a low surface tension of the polymer/solvent mixture. Solvent choice can also be guided by this consideration.

In one embodiment of the invention, the solvent(s) has a boiling point below 120 degrees Celsius, such as within the range of 50-110 degrees Celsius, e.g. within the range of 55-105 degrees Celsius, such as within the range of 60-100 degrees Celsius, e.g. within the range of 65-95 degrees Celsius, such as within the range of 70-90 degrees Celsius.

In another embodiment, the solvent(s) are selected from the group consisting of an alcohol having a boiling point below 120 degrees Celsius, such as within the range of 50-110 degrees Celsius, e.g. within the range of 55-105 degrees Celsius, such as within the range of 60-100 degrees Celsius, e.g. within the range of 65-95 degrees Celsius, such as within the range of 70-90 degrees Celsius.

In a specific embodiment, the alcohol is mixed with water.

A fourth aspect of the invention relates to a method for the production of a composite fiber, comprising the steps of:
  Providing an electrospin dope comprising a polymer micelle with a shell of polymer and a core of aero gel,
  Subjecting said electrospin dope to a spinning step to obtain the composite fiber.

Another aspect of the invention relates to a method for the production of a composite fiber, comprising the steps of:
  Providing an electrospin dope comprising a polymer micelle with a shell of polymer and a core of aero gel particles,
  Subjecting said electrospin dope to a spinning step to obtain the composite fiber.

A fifth aspect of the invention relates to a composite fiber prepared by a process comprising the steps of:
  Mixing aero gel and one or more polymer(s);
  Adding one or more solvent(s) to said mix to form an electrospin dope comprising a polymer micelle with a shell of polymer and a core of aero gel; and
  Subjecting said electrospin dope to a spinning step to obtain the composite fiber.

Another aspect of the invention relates to a composite fiber prepared by a process comprising the steps of:
  Mixing aero gel particles and one or more polymer(s);
  Adding one or more solvent(s) to said mix to form an electrospin dope comprising a polymer micelle with a shell of polymer and a core of aero gel particles; and
  Subjecting said electrospin dope to a spinning step to obtain the composite fiber.

Since the aero gel retains its structure within the composite fiber, the good insulation properties are transferred to the composite fiber. The polymer component/matrix contributes with the mechanical properties. The material is designed in such a way that the aero gel is completely encapsulated by the polymer matrix. This encapsulation contributes to the protection against climatic conditions.

A composite fiber according to the present invention can then be processed into an insulation material, e.g. as a nonwoven material.

In the present invention, the term "nonwoven" refers to a manufactured sheet, web or batt of directionally or randomly oriented fibres, bonded by friction, and/or cohesion and/or adhesion, excluding paper and products which are woven, knitted, tufted, stitch-bonded incorporating binding yarns or filaments or felted by wet-milling, whether or not additionally needled. The fibres may be of natural or man-made origin. They may be staple or continuous filaments or be formed in situ. In the present context, at least a part of the fibres, are fibres of the present invention.

It should be noted that embodiments and features described in the context of one of the aspects of the present invention also apply to the other aspects of the invention.

The invention will now be described in further details in the following non-limiting examples.

EXAMPLES

Proof of Concept

The main object of this study was to provide a composite fiber with aero gel particles encapsulated by polymer(s). The proof of concept was achieved, using an aero gel (silica based, and in powder form) supplied by Sensual Aero gel, and a poly(ethylene-glycol) with a chain length of 900 kea obtained from Sigma Aldrich. The aero gel powder has a monodisperse particle distribution with a peak size of 80 µm, and a maximum particle size of 100 µm.

Polymer-Aero gel Compatibility

Figure 2:
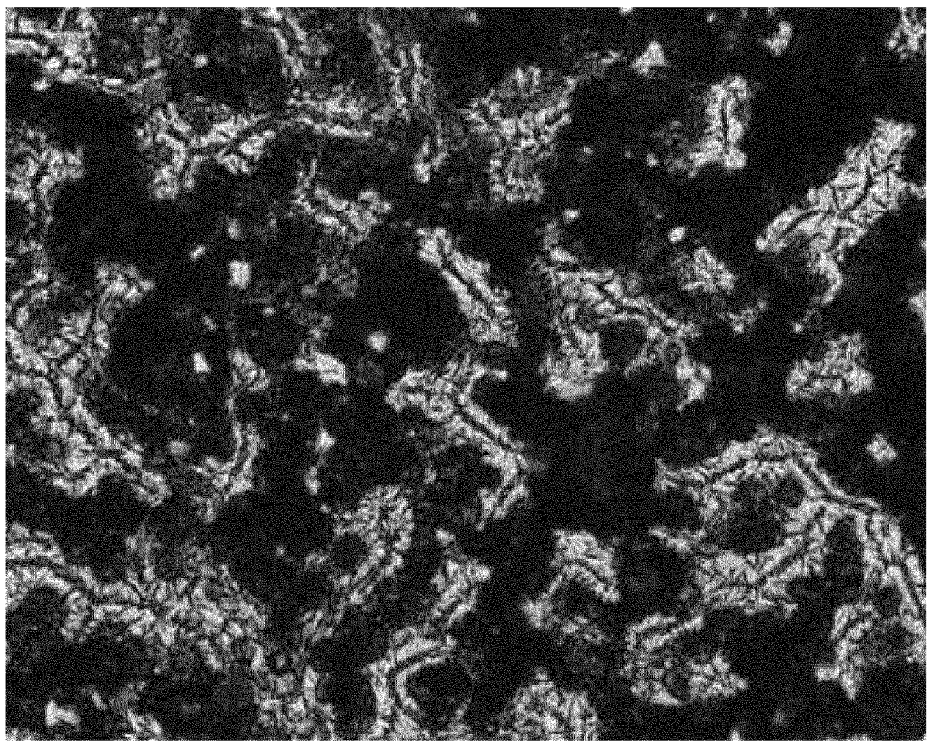
FIG. 2 shows sample Nr. 3 (Table 2) under microscopy, at 10-times magnification. It can be seen that micelles are formed with aero gel particle(s) as core and polymer as shell.
Figure 3:
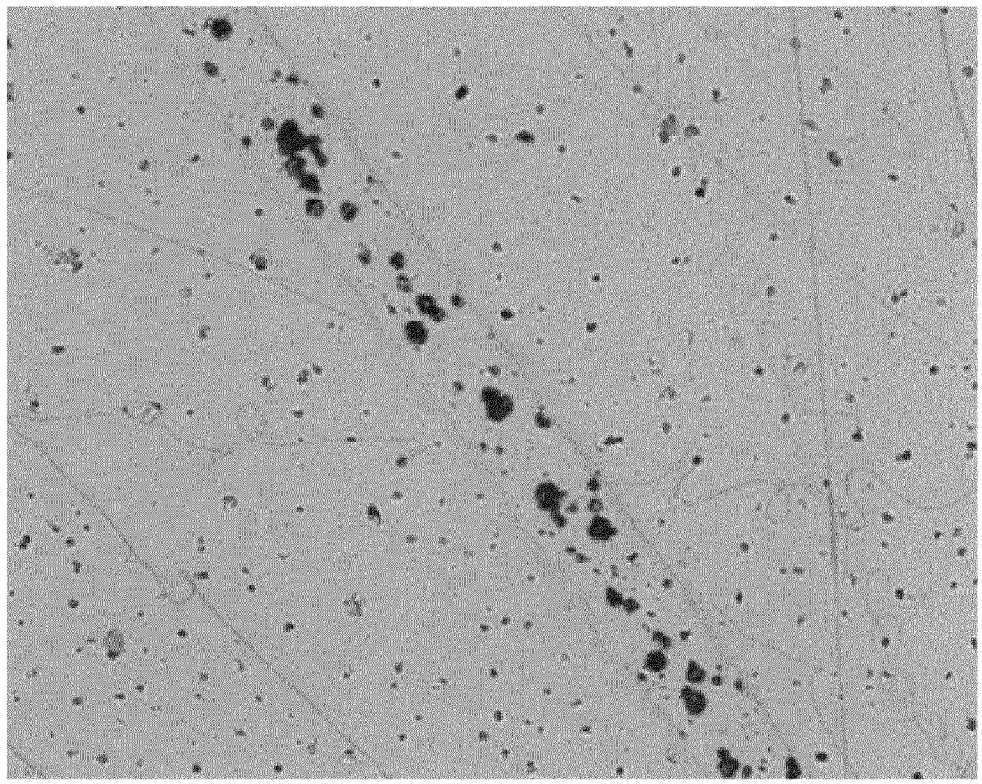
FIG. 3 shows sample Nr. 4 (Table 2) under microscopy, at 10-times magnification. A composite fiber is shown, wherein the aero gel particle(s) are encapsulated by the polymer.
Figure 4:
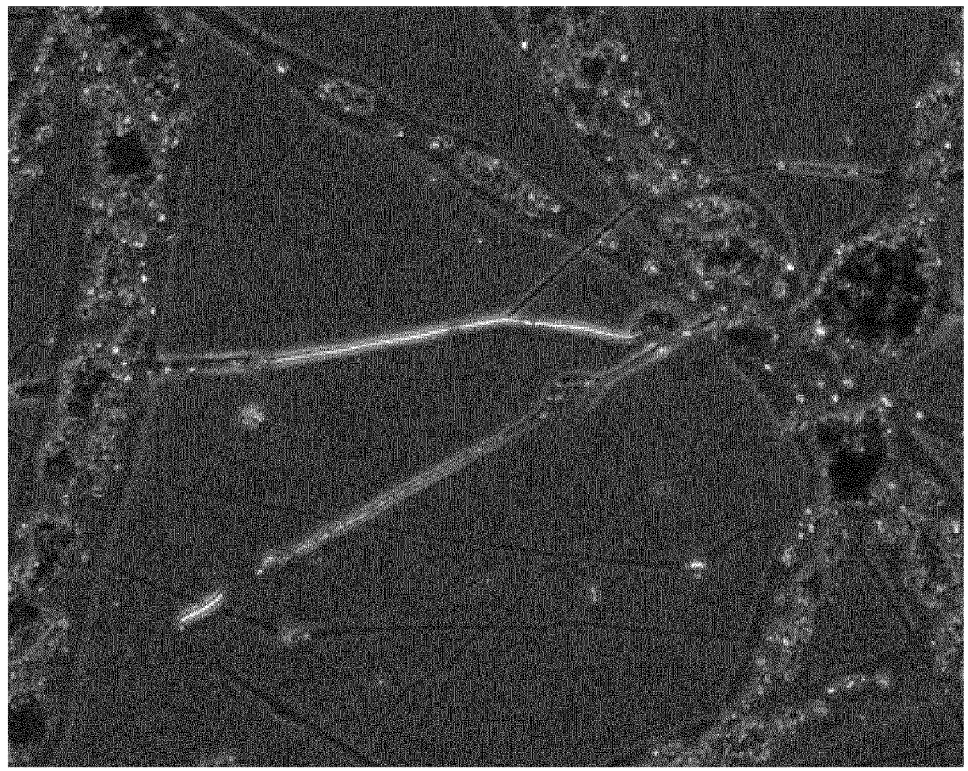
FIG. 4 shows sample Nr. 10 (Table 2) under microscopy, at 10-times magnification. Several composite fibres are shown, wherein the aero gel particle(s) are encapsulated by the polymer.
Figure 5:
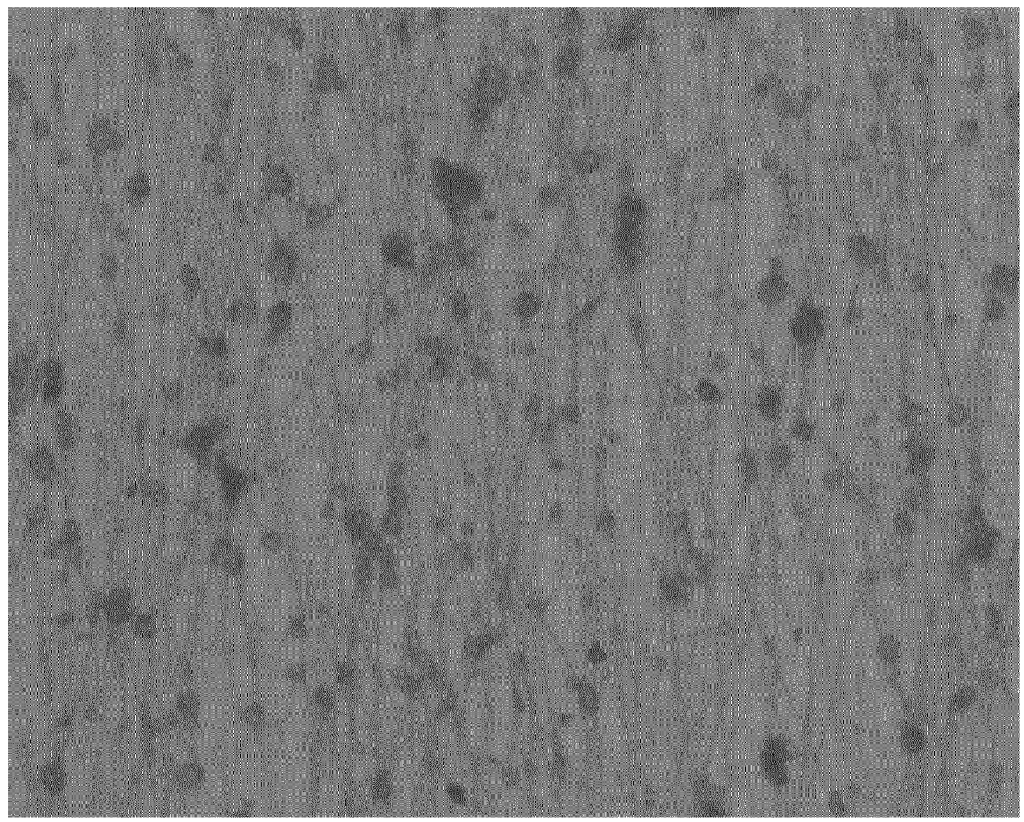
FIG. 5 shows sample Nr. 11 (Table 2) under microscopy, at 10-times magnification. Several composite fibres are shown, wherein the aero gel particle(s) are encapsulated by the polymer, and wherein the fiber is narrow between segments where aero gel particle(s) are encapsulated.
Figure 6:
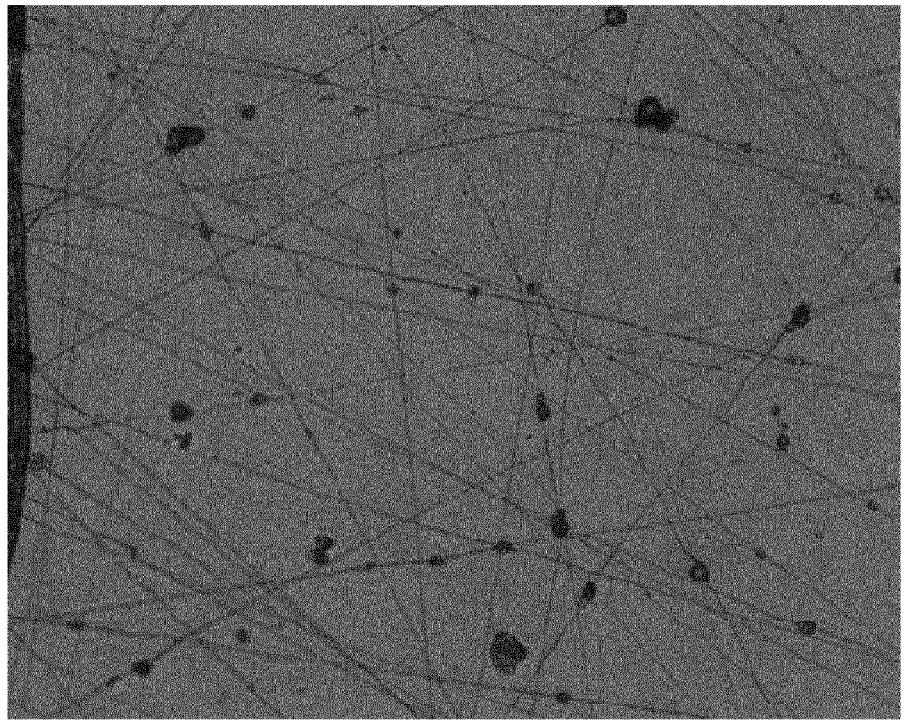
FIG. 6 shows sample Nr. 12 (Table 2) under microscopy, at 10-times magnification. Several composite fibres are shown, wherein the aero gel particle(s) are encapsulated by the polymer, and wherein the fiber is narrow between segments where aero gel particle(s) are encapsulated.
Figure 7:
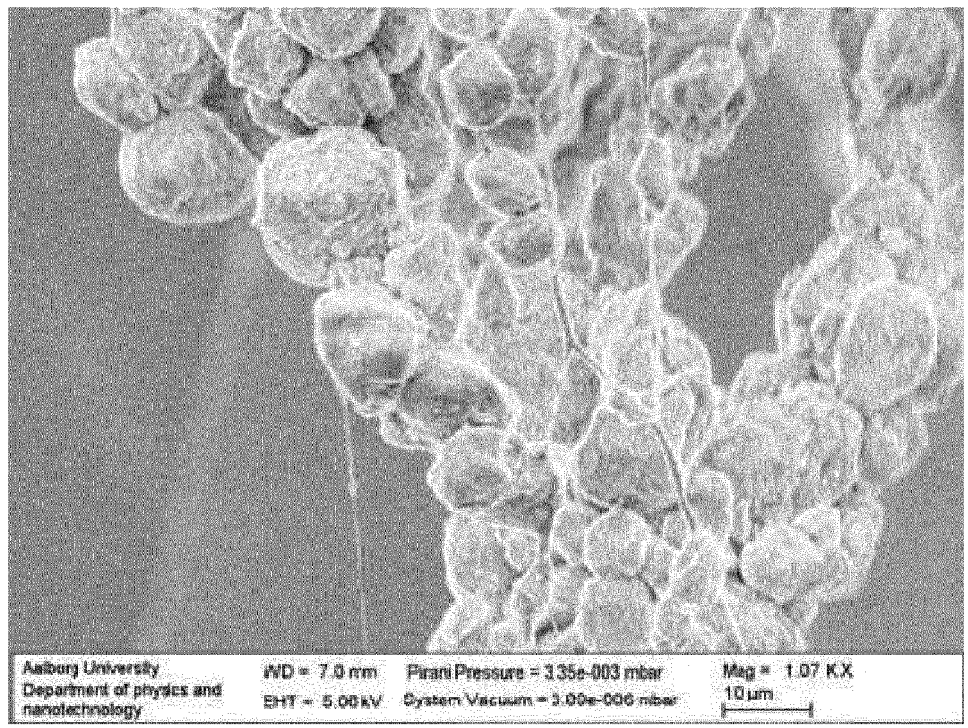
FIG. 7 shows sample Nr. 13 (Table 2), electro-spun at 0.25 ml/h, imaged with SEM.
Figure 8:
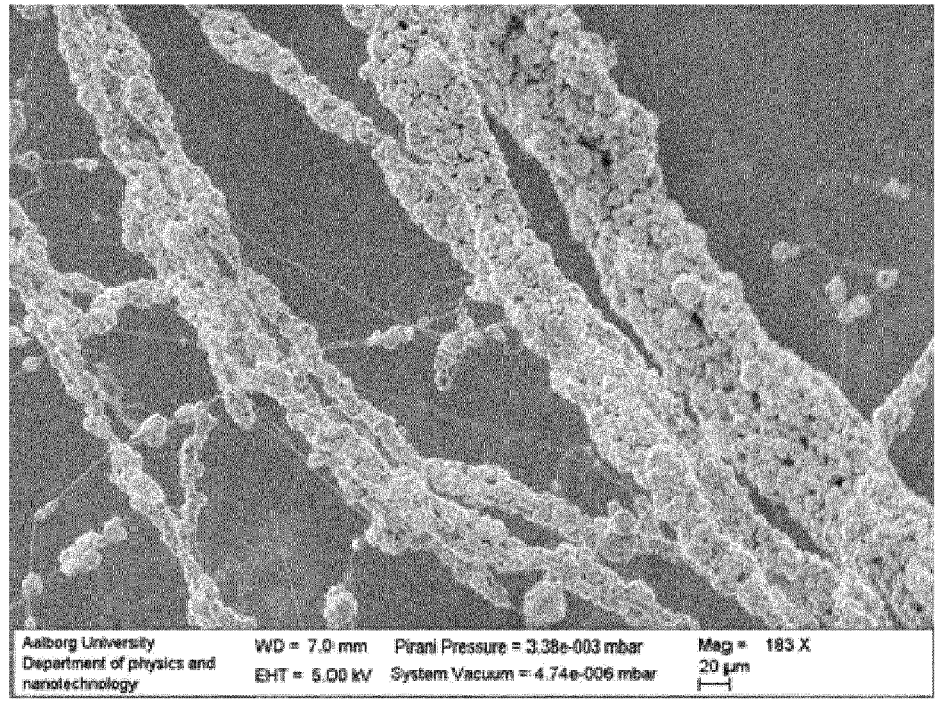
FIG. 8 shows sample Nr. 13 (Table 2), electro-spun at 0.50 ml/h, imaged with SEM.
Figure 9:
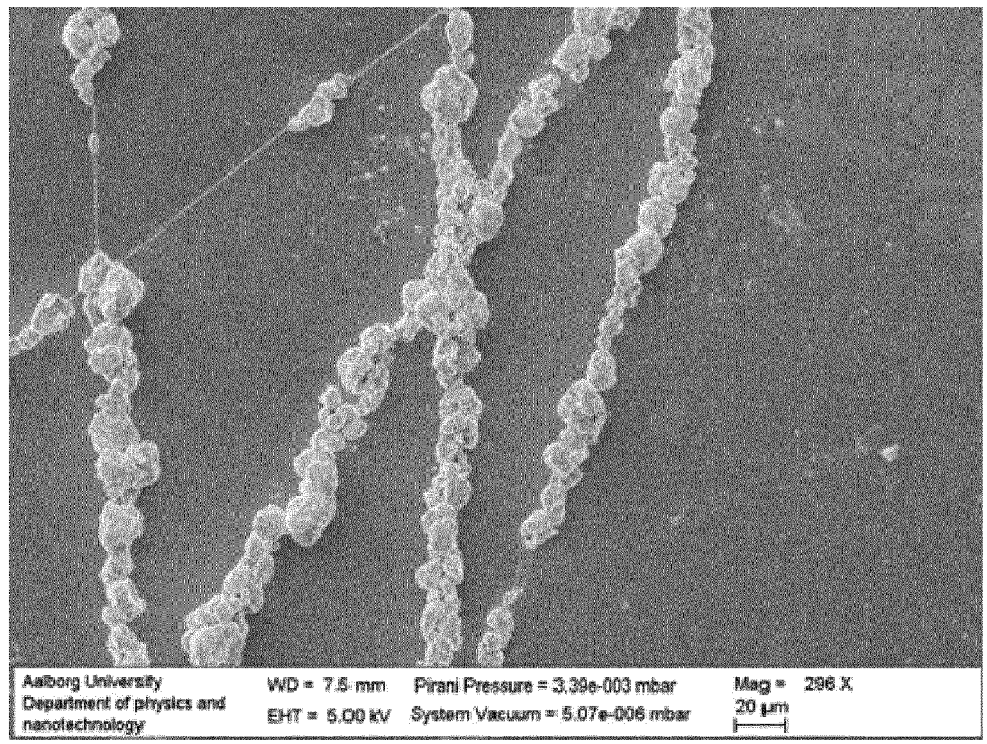
FIG. 9 shows sample Nr. 13 (Table 2), electro-spun at 1.25 ml/h, imaged with SEM.
Figure 10:
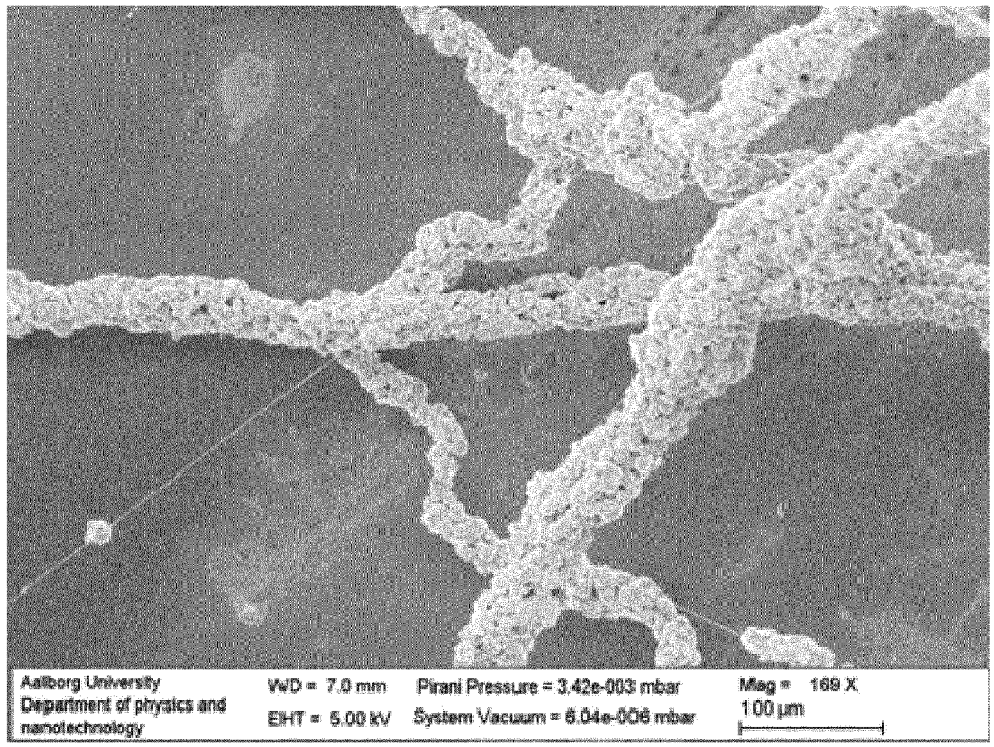
FIG. 10 shows sample Nr. 13 (Table 2), electro-spun at 1.50 ml/h, imaged with SEM. The fiber morphology is uniform and they are forming a network. The composite fibres are below 100 µm in diameter.

Preliminary studies of the compatibility between the polymer and the aero gel were performed. An electrospin dope was prepared by adding powders of polymer and aero gel into a beaker. A polypropylene spoon was used for mixing, and after the two powders were mixed, ethanol or tert-butanol was added under stirring or mixing. It was observed by microscopy (FIGS. 1 and 2) that ordered polymer structures were formed around the aero gel particles, seen as small lines in the clear polymer areas directing towards the aero gel particle core. These ordered structures are energy equilibrium structures, where the polymer arranges optimally around the aero gel particle to form a polymer micelle.

After the formation of the electrospin dope comprising a polymer micelle with a shell of polymer and a core of aero gel, water is added drop wise thereto. It is important that the water is added slowly, to avoid that the mixture does not separate into a water phase and a polymer phase. The method described above is used to mix 0.2 g, 1.5 g, 3 g, 4.5 g, 6 g and 12 g aero gel samples with 1.5 g polymer in a 50 ml solution. 20 ml ethanol or tert-butanol was added to each sample, and water was added until the total volume of each sample solution is 50 ml. The sample solutions were then wrapped with parafilm and stored for further experiments. Sample solutions with 0.2 g and 3 g aero gel were tested with tert-butanol and water as solvents; and sample solutions with 1.5 g, 3.0 g, 4.5 g, 6.0, and 12 g aero gel were tested with ethanol and water as solvents (Table 1). A representative image of both types can be seen in FIGS. 1 and 2 for tert-butanol and ethanol types, respectively. On both figures it can be seen that micelles are formed.

TABLE 1

| Mixture number | Date of preparation | Solvent(s) | Polymer (g) | Aerogel (g) | Ultrasonic bath (min) |
|---|---|---|---|---|---|
| 1 | 15 Nov. 2012 | t-butanol + H2O | 1.5 | 0.2 | 0 |
| 2 | 15 Nov. 2012 | t-butanol + H2O | 1.5 | 3.0 | 0 |
| 3 | 20 Nov. 2012 | ethanol + H2O | 1.5 | 1.5 | 0 |
| 4 | 3 Dec. 2012 | ethanol + H2O | 1.5 | 3.0 | 0 |
| 5 | 6 Dec. 2012 | ethanol + H2O | 1.5 | 4.5 | 60 |
| 6 | 6 Dec. 2012 | ethanol + H2O | 1.5 | 6.0 | 60 |
| 7 | 12 Dec. 2012 | ethanol + H2O | 1.5 | 12.0 | 60 |

Spinning of Composite Fibres

Electro-spinning was performed with a syringe-pump, a high voltage supply and a grounded collector. A polypropylene syringe was placed in the pump, and connected with a Teflon tube to a 0.80 gauge steel needle. The distance between the tip of the needle and the grounded collector plate was measured. The high voltage supply was connected to the needle. The details are shown in Table 2, and examples of fibres formed by different processing parameters are shown in FIGS. 3-10.

TABLE 2

Detailed parameters of the processing of individual samples. The mixture number refers to Table 1. Samples where "Voltage" and "Distance" are marked as "NA" are pulled onto a microscopy slide, in order to examine the interaction of aerogel and polymer, and are hence not electro-spun.

| Date of preparation | Mixture Nr. | Distance (cm) | Voltage (kV) | Flowrates (ml/h) |
|---|---|---|---|---|
| 16 Nov. 2012 | 1 | NA | NA | NA |
| 16 Nov. 2012 | 2 | NA | NA | NA |
| 21 Nov. 2012 | 3 | NA | NA | NA |
| 29 Nov. 2012 | 3 | 20 | 24 | 2 |
| 29 Nov. 2012 | 3 | 15 | 9 | 0.5 |
| 29 Nov. 2012 | 3 | 15 | 12 | 0.5 |
| 4 Dec. 2012 | 4 | 15 | 20 | 2 |
| 7 Dec. 2012 | 5 | NA | NA | NA |
| 7 Dec. 2012 | 6 | NA | NA | NA |
| 10 Dec. 2012 | 6 | 15 | 9 | 0.2 + 2 |
| 12 Dec. 2012 | 6 | 15 | 9 | 0.5 |
| 13 Dec. 2012 | 7 | 15 | 9 | 0.5 |
| 19 Dec. 2012 | 7 | 15 | 9 | 0.25 + 0.5 + 1 + 1.5 + 2 |

The invention claimed is:

1. A composite fibre comprising one or more polymer(s) and aerogel particles, wherein the aerogel particles are encapsulated by the one or more polymer(s), and wherein the aerogel particles are positioned along at least a part of said composite fibre; wherein the particle size of the aerogel is within the range of 0.1-500 µm; wherein the aerogel particles exhibit a porosity of 50% or more, and pores ranging from 2 to 50 nm in diameter.

2. A composite fibre according to claim 1, with the proviso that the polymer(s) and aerogel particle is not connected by covalent bonding.

3. A composite fibre according to claim 1, wherein the aerogel particle is a silica aerogel particle.

4. A composite fibre according to claim 1, wherein the particle size of the aerogel is within the range of 0.1-5000 µm.

5. A composite fibre according to claim 1, wherein the particle size of the aerogel is below 200 µm.

6. A method for production of a composite fibre, comprising the steps of:
   Providing a electrospin dope comprising a polymer micelle with a shell of polymer and a core of aerogel particle,
   Subjecting said electrospin dope to a spinning step to obtain the composite fibre;
   wherein the particle size of the aerogel is within the range of 0.1-500 µm; wherein the aerogel particles exhibit a porosity of 50% or more, and pores ranging from 2 to 50 nm in diameter.

7. A method according to claim 6, wherein the spinning step is an electro-spinning step.

8. A method according to claim 6, wherein the particle size of the aerogel is within the range of 0.1-5000 µm.

9. A method according to claim 6, wherein the particle size of the aerogel is below 200 82 m.

10. A composite fibre prepared by a process comprising the steps of:
    Mixing aerogel particles and one or more polymer(s);

Adding one or more solvent(s) to said mix to form a electrospin dope comprising a polymer micelle with a shell of polymer and a core of aerogel particle(s); and Subjecting said electrospin dope to a spinning step to obtain the composite fibre; wherein the particle size of the aerogel is within the range of 0.1-500μm; wherein the aerogel particles exhibit a porosity of 50% or more, and pores ranging from 2 to 50 nm in diameter.

11. A composite fibre according to claim 10, wherein the particle size of the aerogel is within the range of 0.1-5000 μm.

12. A composite fibre according to claim 10, wherein the particle size of the aerogel is below 200 μm.

* * * * *

UNITED STATES PATENT AND TRADEMARK OFFICE
CERTIFICATE OF CORRECTION

PATENT NO. : 9,683,092 B2  Page 1 of 1
APPLICATION NO. : 14/773453
DATED : June 20, 2017
INVENTOR(S) : Anna Fricke et al.

It is certified that error appears in the above-identified patent and that said Letters Patent is hereby corrected as shown below:

In the Claims

In Column 8, Line 64, (Claim 9, Line 2) "200 82 m" should be --200 μm--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*